United States Patent
Lee et al.

(10) Patent No.: US 10,230,474 B1
(45) Date of Patent: Mar. 12, 2019

(54) DISPERSION COMPENSATION APPARATUS AND DRIVING METHOD THEREOF

(71) Applicant: OPTELLA INC., Gwangju (KR)

(72) Inventors: Sangsoo Lee, Gwangju (KR); Jaeho Song, Gwangju (KR)

(73) Assignee: OPTELLA INC., Gwangju (KR)

( * ) Notice: Subject to any disclaimer, the term of this patent is extended or adjusted under 35 U.S.C. 154(b) by 0 days.

(21) Appl. No.: 16/009,526

(22) Filed: Jun. 15, 2018

(51) Int. Cl.
*H04B 10/572* (2013.01)
*H04B 10/50* (2013.01)
*H04B 10/079* (2013.01)
*H04B 10/2513* (2013.01)

(52) U.S. Cl.
CPC ..... *H04B 10/572* (2013.01); *H04B 10/07957* (2013.01); *H04B 10/25137* (2013.01); *H04B 10/504* (2013.01)

(58) Field of Classification Search
CPC ................ H04B 10/572; H04B 10/504; H04B 10/07957; H04B 10/25137
See application file for complete search history.

(56) References Cited

U.S. PATENT DOCUMENTS

| 5,825,792 | A | 10/1998 | Villeneuve et al. |
| 5,875,273 | A * | 2/1999 | Mizrahi ................. H01S 3/13 362/551 |
| 6,058,131 | A | 5/2000 | Pan |
| 6,067,181 | A * | 5/2000 | Mizrahi ................. H01S 5/141 398/1 |
| 6,963,685 | B2 | 11/2005 | Mahgerefteh et al. |
| 7,505,694 | B2 | 3/2009 | Johnson et al. |
| 8,199,785 | B2 | 6/2012 | Zheng et al. |
| 8,532,153 | B2 | 9/2013 | Zheng et al. |
| 8,867,579 | B2 | 10/2014 | Goobar et al. |
| 2004/0090620 | A1 | 5/2004 | Farr |

OTHER PUBLICATIONS

US 8,887,579, 10/2014, Goobar et al. (withdrawn)

(Continued)

*Primary Examiner* — Casey Kretzer
(74) *Attorney, Agent, or Firm* — Dilworth & Barrese, LLP; Michael J. Musella, Esq.

(57) ABSTRACT

An optical transmitter and a method for driving the optical transmitter include generating a modulated signal having an operation frequency corresponding to a communication channel, obtaining a first optical signal using passing a portion of the modulated signal through a first optical path, obtaining a second optical signal using passing another portion of the modulated signal through a second optical path having a different spectral response curve from that of the first optical path, converting the first optical signal to a first electrical signal, converting the second optical signal to a second electrical signal, obtaining an error signal between the first and second electrical signals, finding a maximum of the error signal by varying the operation frequency over a predetermined frequency range of the communication channel, and determining that the operation frequency is matched to a passband of a frequency reshaper when the error signal reaches the maximum.

17 Claims, 9 Drawing Sheets

(56) References Cited

OTHER PUBLICATIONS

Chang-Hee Lee et al., "Transmission of directly modulated 2.5-Gb/s signals over 250-km of nondispersion-shifted fiber by using a spectral filtering method", IEEE Photonics Technology Letters, vol. 8, Issue 12, pp. 1725-1727 (1996).
Matt McAdams et al., "Improved laser modulation response by frequency modulation to amplitude modulation conversion in transmission through a fiber grating", Appl. Phys. Lett. 71, 879 (1997).
Hsiao-Yun Yu et al., "Signals from Semiconductor Optical Devices by Pulse Reshaping Using a Fiber Bragg Grating Filter", Journal of Lightwave Technology vol. 17, Issue 5, pp. 898-903 (1999).
Y. Sorel et al., "10 Gbit/s transmission experiment over 165 km of dispersive fibre using ASK-FSK modulation and direct detection", Electronics Letters vol. 29, Issue 11, pp. 973-975 (1993).
Chang-Hee Lee et al., "Reduction of Chirping Penalty in Directly Modulated Multigigabit Transmission by Spectral Filtering", OSA/CLEO, CTuI10, (1995).
R. S, Vodhanel, "Performance of directly modulated DFB lasers in 10-gb/s ASK, FSK, and DPSK lightwave systems", Journal of Lightwave Technology, vol. 8, Issue 9, pp. 1379-1386 (1990).

\* cited by examiner

DISPERSION COMPENSATION APPARATUS AND DRIVING METHOD THEREOF

FIELD

The present disclosure relates to an optical communication system, and more particularly to an optical transmitter with a dispersion compensation apparatus and a method for driving the optical transmitter.

BACKGROUND

Due to advantages such as low cost, small size, and low power-consumption, optical transmitters based on a directly modulated laser have extensively been developed. However, a frequency chirp generated when a laser is directly modulated causes a dispersion penalty when it is transmitted over an optical dispersive medium such as an optical fiber so as to limit a transmission distance of the optical modulated signal.

To compensate the dispersion penalty, there have been provided various methods using: a dispersion-compensating optical fiber, a dispersion-compensating chirped fiber grating, an electrical equalizer, and an optical frequency reshaper.

In particular, the optical frequency reshaper-based method allows more compact and integrated design for an optical transmitter. The optical frequency reshaper may function to convert a frequency-modulated (FM) chirped signal to an amplitude-modulated (AM) signal at a transmitter side, thus requiring an accurate laser frequency control to be matched to a passband of the frequency reshaper. For example, in case where the laser frequency is switched over multiple optical communication channels, more accurate and faster control feedback mechanisms for monitoring and minimizing a frequency offset between the laser and the passband of the frequency shaper are needed.

SUMMARY

In one aspect there is provided an optical transmitter. The optical transmitter according to an embodiment of the present disclosure includes a light source, first and second light detectors, a frequency reshaper and at least one processor. The light source is configured to generate a modulated signal whose operation frequency corresponds to a first communication channel. The modulated signal is divided and travels along with at least a first optical path and a second optical path to generate a first optical signal and a second optical signal, respectively. The first light detector is configured to receive and convert the first optical signal to a first electrical signal. The second light detector is configured to receive and convert the second optical signal to a second electrical signal. The second optical path includes a frequency reshaper having a stopband corresponding to the first communication channel. The second optical signal has a minimum when the operation frequency is at a center frequency of the stopband or in the vicinity thereof. The at least one processor includes hardware. The at least one processor is configured to receive the first and second electrical signals, obtain an error signal corresponding to a difference in magnitude between the first and second electrical signals, find a maximum of the error signal by varying the operation frequency over a first predetermined frequency range of the first communication channel, and determine that the operation frequency is matched to a passband of the frequency reshaper corresponding to the first communication channel when the error signal reaches the maximum. The passband corresponds to the first communication channel and is substantially opposite in spectral response to the stopband.

In one embodiment, a spectral response of the first optical path is flat over at least the first communication channel or varies more slowly than a spectral response of the stopband.

In one embodiment, the light source includes a frequency tunable laser.

In one embodiment, the at least one processor is further configured to stop varying the operation frequency upon determining that the operation frequency is matched to the passband of the frequency reshaper.

In one embodiment, to vary the operation frequency, the at least one processor is configured to provide a frequency control signal to a frequency tuning section of the light source.

In one embodiment, the frequency tuning section comprises a grating whose resonance frequency varied depending on an amplitude of the frequency control signal.

In one embodiment, the at least one processor is further configured to adjust the operation frequency by a frequency offset from the passband center frequency upon determining that the operation frequency is matched to the passband of the frequency reshaper.

In one embodiment, the frequency offset is a predetermined value based on a data rate of the modulated signal.

In one embodiment, the frequency offset is obtained by varying the operation frequency within a second predetermined frequency range toward a lower frequency band and monitoring at least one signal quality-related parameter from at least one of an output node of the frequency reshaper and an optical receiver positioned at one end of an optical transmission medium over which the modulated signal is transmitted, the second predetermined frequency range being narrower than the first predetermined frequency range.

In one embodiment, the first optical path includes an optical filter whose spectral response curve gradually increases or decreases.

In another aspect there is provided a control system for an optical transmitter including a light source. The control system includes at least one processor. The at least one processor includes hardware. The at least one processor is configured to receive a first electrical signal converted from a first optical signal and a second electrical signal converted from a second optical signal. The first and second optical signals each are generated using a modulated signal output from the light source. The second optical signal is obtained by passing a portion of the modulated signal through a stopband of a frequency reshaper. The at least one processor is further configured to obtain an error signal corresponding to a difference in magnitude between the first and second electrical signals, find a maximum of the error signal by varying the operation frequency over a predetermined frequency range of a communication channel, and determine that the operation frequency is matched to a passband of a frequency reshaper when the error signal reaches the maximum, the passband being substantially opposite in spectral response to the stopband.

In one embodiment, the second electrical signal has a minimum when the operation frequency of the light source is matched to a center frequency of the stopband or in the vicinity thereof.

In one embodiment, the at least one processor is further configured to stop varying the operation frequency upon determining that the operation frequency is matched to the passband of the frequency reshaper.

In one embodiment, to vary the operation frequency, the at least one processor is configured to provide a frequency control signal to a frequency tuning section of the light source.

In still another aspect there is provided a method for driving an optical transmitter. The method includes generating, using a light source, a modulated signal having an operation frequency corresponding to a first communication channel, obtaining a first optical signal using passing a portion of the modulated signal through a first optical path, obtaining a second optical signal using passing another portion of the modulated signal through a second optical path having a different spectral response curve from that of the first optical path, converting, using a first light detector, the first optical signal to a first electrical signal, and converting, using a second light detector, the second optical signal to a second electrical signal. The second optical path includes a frequency reshaper having a stopband corresponding to the first communication channel and the second optical signal has a minimum when the operation frequency is at a center frequency of the stopband or in the vicinity thereof. The method further includes obtaining an error signal corresponding to a difference in magnitude between the first and second electrical signals, finding a maximum of the error signal by varying the operation frequency over a first predetermined frequency range of the first communication channel, and determining that the operation frequency is matched to a passband of the frequency reshaper when the error signal reaches the maximum, the passband being substantially opposite in spectral response to the stopband.

In one embodiment, the spectral response curve of the first optical path is flat at least over the first communication channel or varies more slowly than a spectral response curve of the stopband.

In one embodiment, stopping of varying the operation frequency upon determining that the operation frequency is matched to the passband of the frequency reshaper.

In one embodiment, to vary the operation frequency, the method further comprising providing a frequency control signal to a frequency tuning section of the light source.

In one embodiment, the method further includes adjusting the operation frequency by a frequency offset from the passband center frequency upon determining that the operation frequency is matched to the passband of the frequency reshaper.

In one embodiment, the frequency offset is a predetermined value based on a data rate of the modulated signal.

DETAILED DESCRIPTION OF THE EMBODIMENTS

Figure 1:
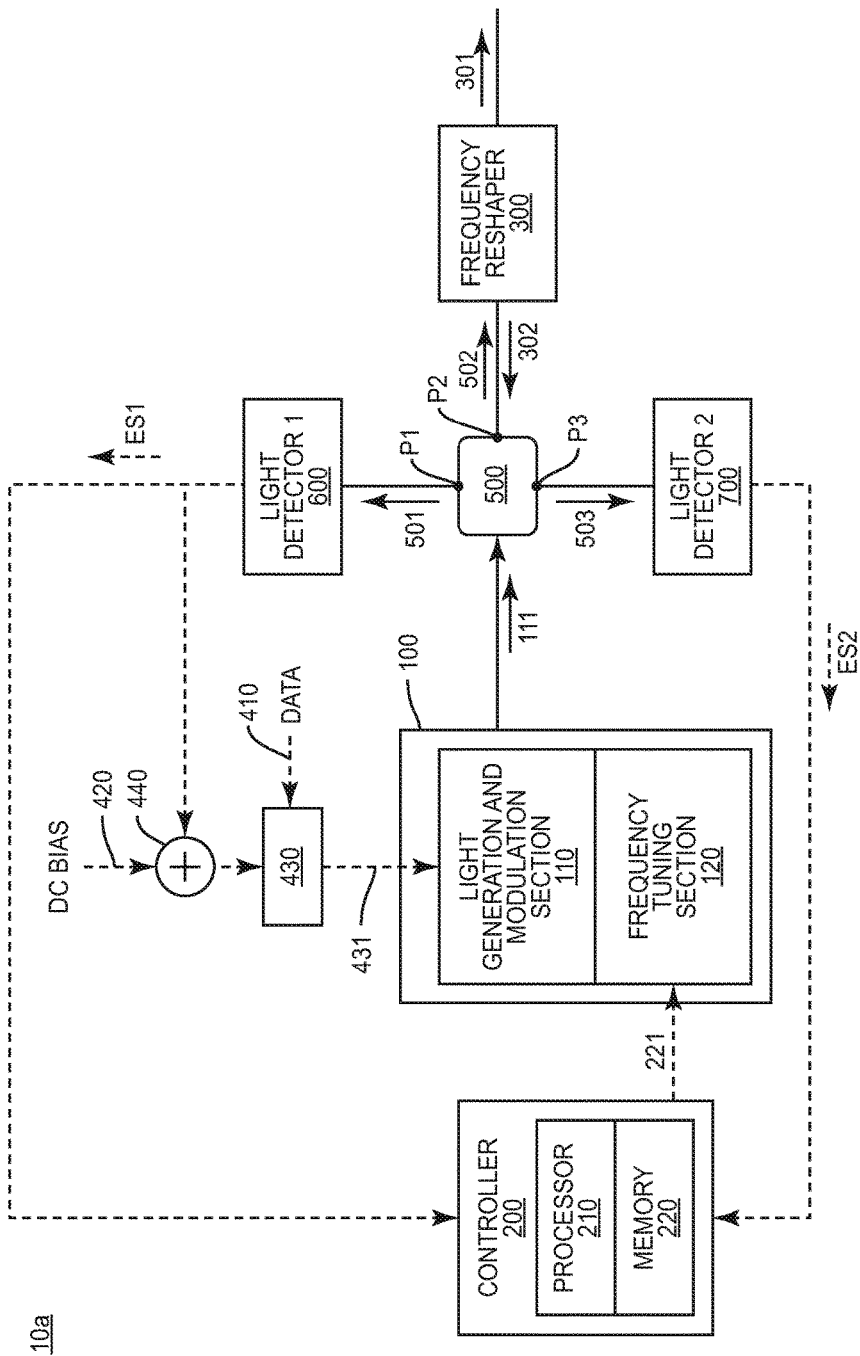
FIG. 1 depicts an optical transmitter according to a non-limiting exemplary embodiment of the present disclosure.

Embodiments of the present disclosure will now be described in detail on the basis of the drawings. However, the following embodiments do not restrict the invention claimed in the claims. Moreover, all combinations of features described in the embodiments are not necessarily mandatory for the architecture of the present system and methods. Like numbers are assigned to like elements throughout the description of the embodiments of the present disclosure.

It will be understood that, although the terms first, second, third, etc. may be used herein to describe various elements. Locations of these elements or orders where the elements are arranged should not be limited by these terms. Instead, these terms are only used to distinguish one element from another element.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term "match" between one frequency (e.g., laser operation frequency) and another frequency (e.g., a passband center frequency of a frequency reshaper) as used herein does not necessarily only refer to an "exact match" where the two frequencies are equal to each other, but can also refer to a "partial match" where a match is determined even if said one frequency is positioned close enough to said another frequency in a predetermined acceptable range.

An optical transmitter and a method for driving the optical transmitter according to a non-limiting exemplary embodiment of the present disclosure provides a feedback control mechanism for monitoring a frequency offset of a laser source from a passband of an optical frequency reshaper and minimizing the frequency offset by adjusting an operation frequency of the laser source. The laser source generates an optical modulated signal. An amount of the frequency offset may be monitored by observing a difference in power between two signals, one of which is obtained by passing a portion of a modulated signal through an optical path whose spectral response curve is dependent on that of a stopband of a frequency reshaper—the stopband has a substantially opposite spectral response curve to that of the passband of the frequency reshaper. Another of the two signal is obtained by passing a portion of the modulated signal through an optical path having a spectral response curve which is flat over at least the passband of the frequency reshaper, which is independent from the stopband of the frequency reshaper, and/or which varies more slowly than the stopband of the frequency reshaper.

The difference in power between the two signals is referred to as an "error signal" for the sake of description. When the operation frequency of the laser source is scanned over the passband of the frequency reshaper, the signal passing through the optical path having the spectral response curve dependent on that of the stopband of the frequency reshaper may have a minimum for the operation frequency being at the center frequency of the stopband or in the vicinity thereof, while the signal passing through another optical path remains unchanged or independently changed from the stopband of the frequency reshaper.

Thus, the optical transmitter according to an embodiment monitors the error signal using a feedback control block and controls the laser operation frequency to maximize the error signal.

The control of the laser operation frequency is made by an amplitude (e.g., in current) of a frequency control signal to be applied to the laser source.

In one embodiment, once the laser operation frequency is set to a desired position (e.g., the center frequency of the passband or in the vicinity thereof), the error signal value obtained at this time can be stored and used as a reference value to see if the laser operation frequency is matched to the passband of the frequency reshaper in case the laser source is switched back to this frequency band later, so that the frequency tuning time can be even faster.

The optical transmitter according to an embodiment uses a digital control mean including at least one processor and a memory to allow the transmitter or an external control unit to store various information, but are not limited to: the maximum error signal value obtained when the laser operation frequency is matched to the corresponding passband of the frequency reshaper; an amplitude of the frequency control signal applied to obtain the maximum error signal value; and relationship between amplitudes of the frequency control signals and their respective corresponding frequency ranges in which the laser is expected to operate, etc.

FIG. 1 depicts an optical transmitter 10a according to a non-limiting exemplary embodiment of the present disclosure. Referring now to FIG. 1, the optical transmitter 10a includes a laser source 100, a modulation signal driving block, a feedback control block, and a frequency reshaper 300.

Figure 2A:
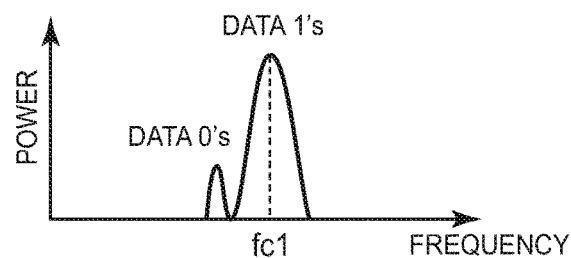
FIG. 2A depicts an example power spectrum of an optical modulated signal according to a non-limiting exemplary embodiment of the present disclosure.

The laser source 100 includes a light generation/modulation section 110 and a frequency tuning section 120. For example, in the light generation/modulation section 110, light is generated and directly modulated according to an electrical modulation signal 431 driven by the modulation signal driving block. In the modulation signal driving block, a data signal 410 is combined with a dc bias current 420 through a bias-tee 430 or other combining means to provide the modulation signal 431. A portion of a first electrical signal ES1—which will be described later—provided from a first light detector 600 may be used for the purpose of an automatic-power control (APC) to the laser source 100 and may be combined with the DC bias current 420 through a node 440 and provided to the bias tee 430. FIG. 2A is an example power spectrum of an optical modulated signal 111 according to a non-limiting exemplary embodiment of the present disclosure. Since the modulated signal 111 is a chirped signal, power of data 1's signal is spaced apart in frequency domain from power of the data 0's signal. Given that the directly-modulated signal is an intensity-modulated signal, the power of the data 0's signal may be relatively lower than the power of the data 1's signal.

Each of the first and second light detectors 600 and 700 includes one or more optical-to-electrical (O/E) conversion elements such as photo-diodes, etc.

The feedback control block is configured to monitor a difference in power (referred to an "error signal") between two optical signals obtained by passing the modulated signal 111 through different optical paths in frequency response, respectively and generate a frequency control signal 221 based on the error signal so as to control the laser operation frequency to maximize an amplitude of the error signal.

The frequency reshaper 300 is configured to convert the chirped directly-modulated signal 111 (e.g., FM-modulated signal) to a signal of which chirp is reduced (compensated) or removed (e.g., AM-modulation signal). For example, the frequency reshaper is also referred as a frequency sifter. To this end, for example, the frequency reshaper 300 is embodied using an optical filter having at least one passband corresponding to an optical communication channel to which the laser source 100 is targeted to operate. That is, the passband of the frequency reshaper 300 may modify a spectrum shape of the input modulated optical signal 111 to pass the data 1's signal and remove the data 0's signal so as to reduce the dispersion penalty over a dispersive medium and increase a contrast ratio (e.g., extinction ratio) between data 1's and 0's. In some embodiments, the frequency reshaper 300 includes a plurality of passbands each of which corresponds to one of optical communication channels. Thus, in the examples with respect to the present disclosure, the data 1's signal is of interest and thus, a frequency fc1 at which a peak of the data 1's signal is located will be referred to as an "operation frequency" or "laser operation frequency" of the laser source 100. In one embodiment, the operation frequency fc1 will be controlled to be matched to a center frequency fop1 of the passband of the frequency reshaper 300, which will be described later with reference to a step S200 of FIG. 3A. In addition, as an optional step (e.g., step S300 of FIG. 3A), the operation frequency will further be offset from the passband center frequency fop1, which will also be understood that the operation frequency will be detuned from the passband center frequency fop1, so that the dispersion penalty caused due to the chirped modulated signal 111 can further be reduced, which will also be described with reference to FIGS. 3A, 4A and 4B.

In an example depicted in FIG. 1, the feedback control block includes an optical path divider 500, two light detectors 600 and 700, and a controller 200. The optical path divider 500 may be embodied using a power splitter, an optical thin film filter or any means for dividing an optical signal into at least two optical paths.

The modulated signal 111 is divided by the optical path divider 500. The optical path divider 500 output the divided modulated signal 111 (e.g., 501 and 502 of FIG. 1) along with two different optical paths: a first optical path and a second optical path. The first optical path and the second optical path each are designed to have different frequency response curves to the input modulated signal 111.

Figure 2B:
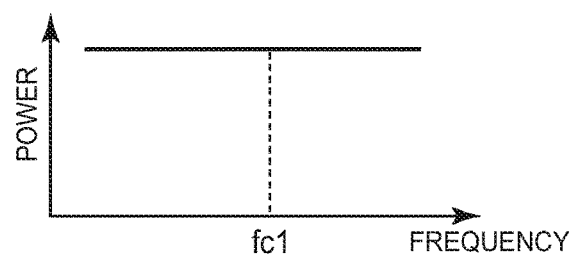
FIG. 2B depicts an example spectral response curve of a first optical path of FIG. 1 according to a non-limiting exemplary embodiment of the present disclosure.

Regarding the first optical path, referring to the example depicted in FIG. 1, the first light detector 600 is directly connected to a port P1 of the optical path divider 500 and thus, the signal 501 output through the port P1 is directly sent to the first light detector 600 and converted to a first electrical signal ES1. In this example, the frequency response curve of the first optical path is flat (e.g., frequency-independent) (see FIG. 2B) or substantially flat over, e.g., a particular optical communication channel band of interest, so that the first electrical signal ES1 provided by the first light detector 600 may be independent from variation of the operation frequency of the laser source 100.

Regarding the second optical path including the frequency reshaper 300, the optical signal 502 output through a port P2 of the optical path divider 500 is sent to the frequency reshaper 300. In case where the second light detector 700 has a frequency-independent characteristic, the spectral response curve of the second optical path may mostly be determined by a spectral response curve of a stopband of the frequency reshaper 300.

Figure 2C:
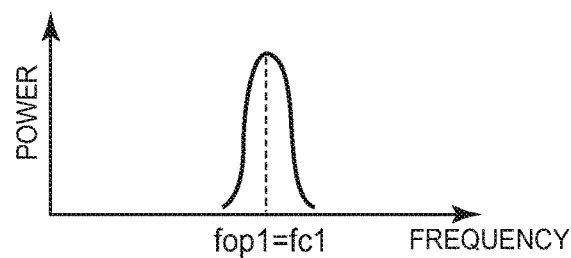
FIG. 2C depicts an example spectral response curve of a passband of a frequency reshaper of FIG. 1 according to a non-limiting exemplary embodiment of the present disclosure.
Figure 2D:
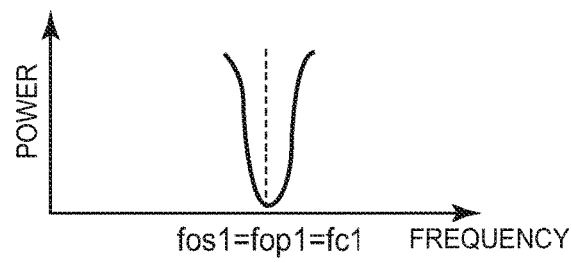
FIG. 2D depicts an example spectral response curve of a stopband of a frequency reshaper of FIG. 1 according to a non-limiting exemplary embodiment of the present disclosure.

In one embodiment, the frequency reshaper 300 has at least one passband (see FIG. 2C) and at least one stopband (see FIG. 2D) of which frequency response curve is opposite to that of the passband. For example, as shown in FIGS. 2C and 2D, the center frequency fop1 of the passband is equal to the center frequency fosl of the stopband. Referring back to FIG. 1, a signal 302, which is obtained by passing the signal 502 through the stopband of the frequency reshaper 300, is provided to the second light detector 700 via the optical path divider 500 as an optical signal 503 via a port P3. The optical signal 503 is converted to the second electrical signal ES2. A signal 301, which is obtained by passing the signal 502 through the passband of the frequency reshaper 300, may be transmitted over an optical transmission medium (e.g., optical fiber). Thus, the second electrical signal ES2 may have a minimum when the laser operation frequency is matched to the center frequency fop1 of the passband of the frequency reshaper 300 or in the vicinity thereof. In other words, given that the first electrical signal ES1 is independent from variation of the operation frequency in frequency (or varies more slowly in response to the variation of the operation frequency than the second electrical signal ES2 does, according to the spectral response curve of the stopband), the error signal corresponding to a difference between the first and second electrical signals ES1 and ES2 will be a maximum when the operation frequency is matched to the center frequency fop1 of the passband of the frequency reshaper 300 (or in the vicinity thereof), as shown in FIGS. 2C and 2D.

In one embodiment, referring back to FIG. 1, the controller 200 of the feedback control block receives the first and second electrical signals ES1 and ES2 and calculates the error signal based on the first and second electrical signals ES1 and ES2 such that the error signal is a difference between the first and second signals, e.g., an amplitude of the error signal=ES1−ES2. In some aspects, a differential circuit (not shown) is disposed between the controller 200 and each of the first and second light detectors 600 and 700 to receive the first and second electrical signals ES1 and ES2 so as to provide a differential value between the signals ES1 and ES2 as the error signal.

It is noted that the error signal varies depending on how much the laser operation frequency is offset from the passband center frequency fop1 of the frequency reshaper 300. Thus, in order to find the maximum error signal value, the operation frequency fc1 may be scanned over a predetermined frequency range subsequent to an error signal value is initially obtained.

The laser operation frequency fc1 is controlled by varying an amplitude of the frequency control signal 221 provided by the controller 200. The memory 220 may include lookup table representing a relationship between an amplitude of the frequency control signal 221 and a corresponding frequency range of the laser operation frequency to be outputted.

For example, as an initial phase, if a particular optical communication channel to which the laser source 100 is targeted is determined, the controller 200 may read an appropriate amplitude of the frequency control signal 221 from the lookup table to generate the frequency control signal 221 of the read amplitude and provide the generated control signal 221 to the frequency tuning section 120 of the laser source 100, so that the modulated signal 111 is switched to have an operation frequency in the passband of the frequency reshaper 300 corresponding to the particular optical communication channel. However, the laser operation frequency set in the above initial phase might not be matched to the center frequency fop1 of the frequency reshaper 300. Thus, in a frequency control phase, the laser operation frequency fc1 is controlled to be matched to the passband center frequency fop1 (or the vicinity thereof). In the frequency control phase, an amplitude of the frequency control signal 221 to be provided to the laser source 100 is gradually varied by a preset interval to vary the laser operation frequency within the predetermined frequency range.

In one embodiment, the laser source 100 is embodied using single wavelength semiconductor lasers such as, e.g., distributed feedback (DFB) lasers and vertical-cavity surface-emitting lasers (VCSELs) which support only a particular optical communication channel. For example, if the laser source is a DFB laser, the frequency tuning section of FIG. 1 may include a temperature electric cooler (TEC) that controls temperature of the light generation/modulation section 110 in the laser source 100. In this example, a portion of the controller 200 may serve as a TEC controller and the frequency control signal 221 may be a signal to control the operation of the TEC of the frequency tuning section 120. For example, for 1-degree of temperature increment to the light generation/modulation section 110, the operation frequency of the DFB laser may be shifted in a range between −5 GHz and −15 GHz (e.g., −12.5 GHz).

In one embodiment, the laser source 100 is embodied using frequency tunable semiconductor lasers including, but are not limited to: a group of distributed Bragg reflector (DBR) based tunable lasers such as DBR, MGY-DBR, SG DBR, SSG-DBR, DS-DBR type lasers. For example, the frequency tunable semiconductor laser includes a gain section corresponding to the light generation/modulation section 110 and a filtering section corresponding to the frequency tuning section 120. The filtering may be implemented using fiber gratins or distributed Bragg gratings. A passband (e.g., resonance frequency) of the filtering section is varied according to an amplitude of the frequency control signal 221 provided from the controller 200, so that the operation frequency of the laser source 100 can be tuned to cover multiple optical communication channels.

For example, the operation frequency of the frequency tunable laser may be shifted in a range between −10 GHz and −40 GHz (e.g., 25 GHz) when an amplitude of the control signal 221 applied to the filtering section is increased by 1 mA, or vice versa (i.e., 25 GHz/mA).

A variation interval of a laser operation frequency may be selected according to a data rate of the modulated signal 111. For example, as the data rate of the modulated signal 111 is increased, the laser operation frequency variation interval may be increased accordingly, and thus, a variation interval of the frequency control signal 221 may be increased accordingly. In one example, the laser operation frequency variation interval may be 6.25 GHz and the corresponding frequency control signal variation interval may be 0.25 mA.

For example, it can be understood that the smaller the operation frequency variation interval, the slower the feedback frequency control block, but the higher the resolution of the frequency scanning over the optical communication channels, thus ensuring more accurate operation frequency control to the optimal point (e.g., the passband center frequency fop1 of the frequency reshaper 300).

It is noted that the laser source described hereinafter is a frequency tunable laser for the sake of description, otherwise explicitly indicated. However, exemplary embodiments of the present disclosure are not limited thereto.

Although it is described and illustrated throughout the present disclosure that the laser source 100 is controlled to have its operation frequency matched to the center frequency (or in the vicinity thereof) of the passband of the frequency reshaper 300, exemplary embodiments of the present disclosure are not limited thereto. For example, the frequency shaper 300 alone or both the frequency shaper 300 and the laser source are controlled for the operation frequency and the passband to be matched; in this example, the controller 200 may additionally provide an appropriate control signal to the frequency shaper 300 (not shown in figures).

In one embodiment, the frequency reshaper 300 includes, but is not limited to: Fabry-Perot (FP) etalon optical filters, fiber grating optical filters, arrayed waveguide grating (AWG) filters, multi-cavity optical filters, etc. For example, a spectral response curve of the frequency reshaper 300 is designed to have a Lorentzian shape at a passband, which can be obtained using, e.g., FP etalon optical filter. The bandwidth at the passband may adaptively be selected depending on a data rate of the modulated signal 111; for example, 0.5×Data Rate≤3 dB bandwidth of the spectral reshaper at a passband≤1.5×Data Rate.

Referring back to FIG. 1, the first and second electrical signals ES1 and ES2 obtained through the first and second light detectors 600 and 700, respectively are sent to the controller 200 of the frequency adjustment control block and are further processed to be described hereafter Detailed operations of the controller 200 for controlling the laser source 100 to reduce a dispersion penalty are described with reference to FIGS. 3A-3C, 4A and 4B.

Figure 3A:
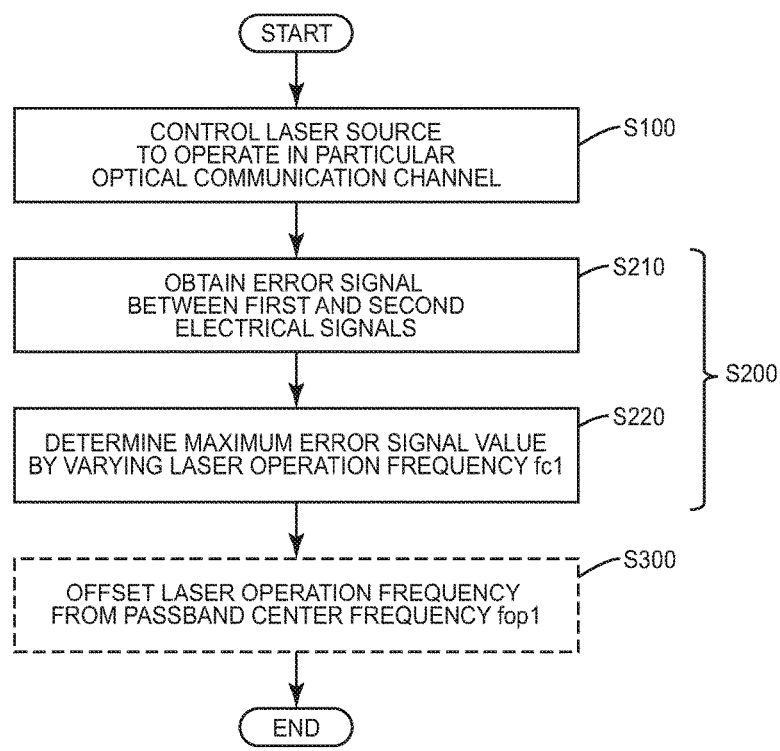
FIG. 3A depicts a flow chart of an example method for controlling a laser operation frequency to reduce a dispersion penalty according to a non-limiting exemplary embodiment of the present disclosure.

Referring now to FIGS. 1 and 3A, when a particular optical communication channel where the laser source 100 is targeted to operate is determined, the laser source 100 may be controlled to have the operation frequency tuned to the passband of the frequency reshaper 300 corresponding to the particular optical communication channel (S100). In one embodiment, the optical communication channel may correspond to a particular channel of a wavelength-division multiplexing (WDM) system or network. To this end, an appropriate level of the control signal 221 is applied to the frequency-tuning section 120 of the laser source 100. In one embodiment, the memory 220 may store information pertaining to relationship (or mapping information) between amplitudes (e.g., in current) of the frequency control signals and their respective corresponding frequency ranges in which the laser source 100 is expected to operate. Thus, the processor 210 coupled to the memory 220 may select an appropriate level of the control signal 221 corresponding to a particular frequency range (or an optical communication channel) by reading the relationship information between the control signal amplitudes and the frequency ranges from the memory 220 and provide the control signal 221 with the selected level to the laser source 100. The processor 210 is coupled to the memory 220.

Next, in step S200 including steps S210 and S220, the processor 210 receives the first and second electrical signals ES1 and ES2 and calculates an error signal value between the first and second electrical signals ES1 and ES2 (S210). Practically, since the laser operation frequency fc1 is deviated (offset) from the center frequency fop1 of the passband of the frequency reshaper 300, the error signal might not be maximal. Thus, in a next phase, the controller 200 controls the laser source 100 to have the laser operation frequency fc1 scanned over a first predetermined frequency range, obtain respective error signal values for each of frequencies at which the laser operation frequency fc1 is set, and determine a maximum value of the error signal values and an amplitude of the control signal 221 applied to obtain the maximum error signal value (S220). For example, the determination of the maximum error signal value can be made by obtaining respective error signal values while varying the laser operation frequency, storing the obtained error signal values to the memory 220, reading the stored error signal values from the memory 220, and comparing the error signal values to each other to determine the maximum error signal. In one embodiment, for a current optical communication channel, the maximum error signal value and its corresponding control signal amplitude may be stored to the memory 220, so that the maximum error signal value and the corresponding control signal amplitude can be used as reference values to ensure faster and more accurate switching of the operation frequency to the passband of the frequency reshaper 300.

In one embodiment, the first predetermined frequency range is dependent on a data rate of the modulated signal 111 or a channel spacing among multiple optical communication channels over which the operation frequency is switched. For example, the first predetermined frequency range is set to be less than half the channel spacing.

In one embodiment, it is determined that the laser operation frequency is matched to a center frequency of the passband of the frequency reshaper 300 when the error signal reaches the maximum. The passband of the frequency reshaper 300 corresponds to an optical communication channel. Next, upon determining that the laser operation frequency is matched to the center frequency of the passband of the frequency reshaper 300, the controller 100 may stop varying the operation frequency while monitoring the error signal to be compared with the maximum error signal value which has been obtained and stored. In some aspects, when the error signal value gets lowered by a predetermined level from the maximum error signal value, the controller 200 may repeat step S220 to make the error signal equal or approximate to the stored maximum error signal.

In varying the laser operation frequency fc1 to obtain the maximum error signal value in the step S220, in one embodiment, the controller 200 controls the laser source 100 to have the laser operation frequency fc1 scanned over a predetermined frequency range. In this example, when the laser operation frequency fc1 is equal to the passband center frequency fop1, the predetermined frequency range can be between fc1−½×Channel Spacing and fc1+½×Channel Spacing.

Figure 3B:
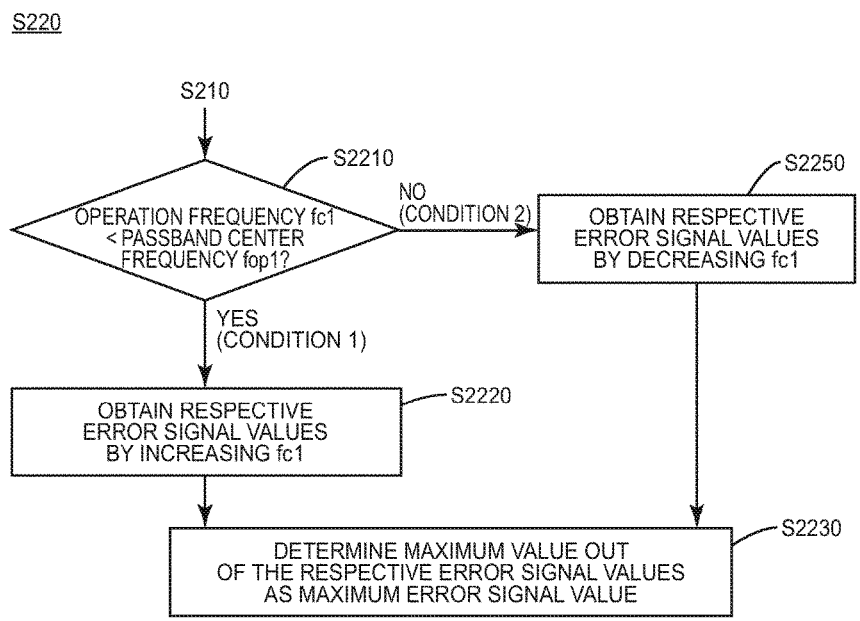
FIG. 3B depicts a flow chart of an example method for performing a step S220 of FIG. 3A according to a non-limiting exemplary embodiment of the present disclosure.

As other embodiments in varying the laser operation frequency fc1 of the step S220, FIG. 3B is depicted showing a detailed flow chart for the step S220 of FIG. 3A. In performing the step S220, it might be unknown to the controller 200 whether to increase or decrease the laser operation frequency fc1 to determine the maximum error signal value. For example, whether to increase or decrease the laser operation frequency fc1 depends on whether the current laser operation frequency fc1 is lower (or less) than the center frequency fop1 of the frequency reshaper 300. Thus, as a step S2210, the controller 200 determines whether the laser operation frequency fc1 is lower than the center frequency fop1 or not (e.g., equal to or higher than the center frequency fop1). If the laser operation frequency fc1 is lower than the center frequency fop1 (e.g., Condition 1), the controller 200 may perform steps S2220 and S2230. If the laser operation frequency fc1 is equal to or higher than the center frequency fop1 (e.g., Condition 2), the controller 200 may perform steps S2250 and S2230.

In the step S2220, the laser operation frequency fc1 is gradually increased within the first predetermined frequency range to obtain respective error signal values for each of frequencies at which the operation frequency is set. In the step S2230, a maximum error signal value and an amplitude of the control signal 221 applied to obtain the maximum error signal value can be determined.

In addition, in the step S2250, the operation frequency fc1 is gradually decreased within the first predetermined frequency range to obtain respective error signal values for each of frequencies at which the operation frequency is set.

Figure 3C:
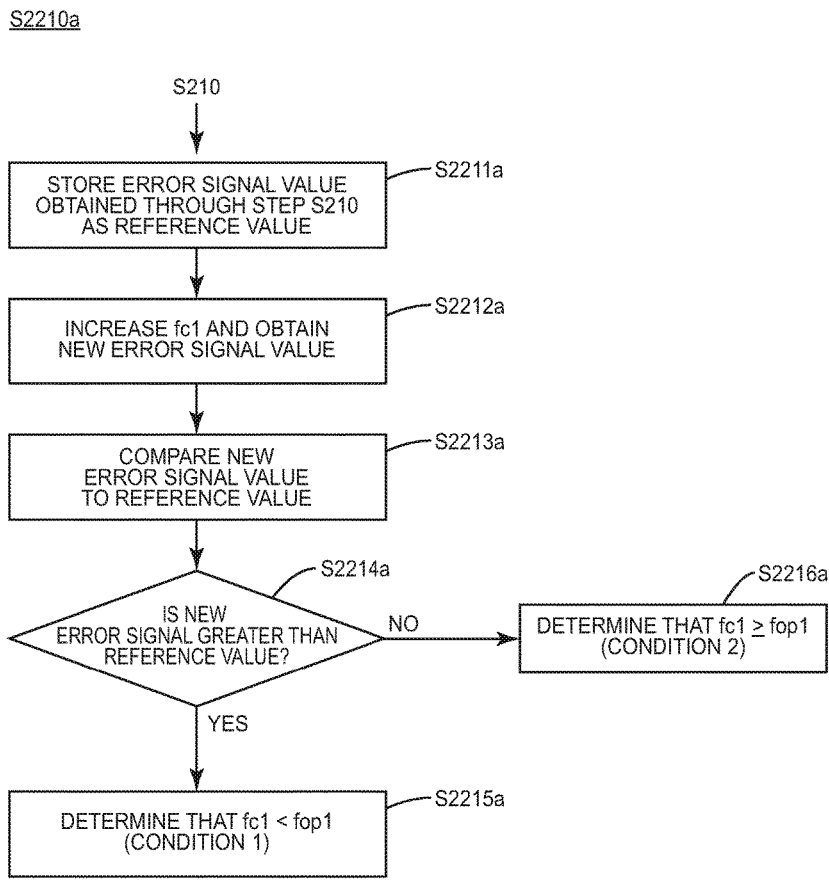
FIG. 3C depicts a flow chart of an example method for performing a step S2210 of FIG. 3B according to a non-limiting exemplary embodiment of the present disclosure.

Depicted in FIG. 3C is detailed a flow chart for the step S2210 of FIG. 3B.

In one embodiment, referring now to FIG. 3C, in step S2211*a*, the error signal value obtained through the step S210 of FIG. 3A is stored as a reference value. Next, the laser operation frequency fc1 is increased by a predetermined interval and a corresponding new error signal value is obtained (S2212*a*). The new error signal value is compared to the reference value (S2213*a*). If the new error signal value is greater than the reference value (S2214*a*), the controller 100 determines that the operation frequency fc1 is lower than the center frequency fop1 of the frequency reshaper 300 in step S2215*a* (e.g., Condition 1); otherwise, the controller 200 determines that the operation frequency fc1 is equal to or higher than the center frequency fop1 of the frequency reshaper 300 in step S2216*a* (e.g., Condition 2).

In some embodiments with detailed steps with respect to the step S2210, the operation frequency fc1 may be decreased by the predetermined interval to obtain a new error signal value that will be compared to to the reference value obtained through the step S2211*a*.

Figure 4A:
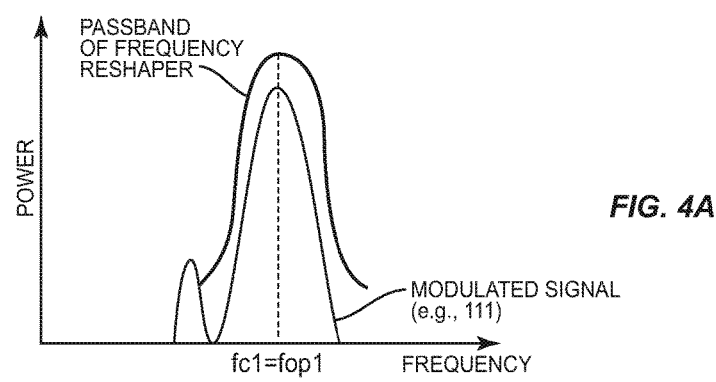
FIG. 4A depicts an example diagram showing when a laser operation frequency is matched to a passband center frequency of a frequency reshaper as an outcome of step S220 of FIG. 3A according to a non-limiting exemplary embodiment of the present disclosure.

FIG. 4A is an example diagram showing when the laser operation frequency fc1 is matched to the center frequency fop1 of the passband as a result of performing the step S220 of FIG. 3A according to a non-limiting exemplary embodiment of the present disclosure.

In one aspect, as an optional step S300 subsequent to the step S220, the operation frequency of the laser source 100 may further be adjusted by a detuning offset Δfdet from the passband center frequency fop1 (e.g., detuned) upon determining that the operation frequency fc1 is matched to the center frequency fop1 of the passband of the frequency reshaper 300.

Figure 4B:
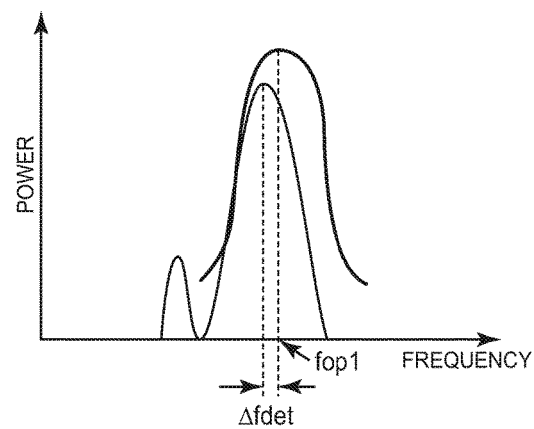
FIG. 4B depicts an example diagram showing when a laser operation frequency is offset from the passband center frequency of the frequency reshaper as an outcome of step S300 of FIG. 3A according to a non-limiting exemplary embodiment of the present disclosure.

Referring now to FIG. 4B, as the laser operation frequency fc1 is adjusted toward a lower frequency band from the passband center frequency fop1 of the frequency reshaper 300, the passband of the frequency reshaper 300 may relatively move to pass through a further portion of the data 1's signal, while rejecting a further portion of the data 0's signal so as to increase a contrast ratio (e.g., extinction ratio) between the data 1's and data's 0 signals and reduce a dispersion penalty of the modulated signal 111.

There may be an optimal detuning offset Δfdet that maximize the dispersion penalty compensation effect. In one aspect, the optimal detuning offset Δfdet can be calculated and preset as to how much of frequency offset is required and which direction the frequency offset needs to be made from the passband center frequency fop1. For example, the optimal detuning offset Δfdet may be predetermined based on a data rate of the modulated signal 111 and/or obtained through experimentally observed results. For example, one or more optimal detuning offsets pertaining to a particular optical communication channel and/or a data rate of the modulated signal 111 may be stored in the memory 220, and the processor 210 may select at least one of the one or more optimal detuning offsets from the memory 220 for the particular optical communication channel and the data rate of the modulated signal 111. In the example depicted in FIG. 4B, the frequency offset from the passband center frequency fop1 is made for the laser operation frequency fc1 to be shifted toward the left side with respect to the passband center frequency fo1 of the frequency reshaper 300.

In another aspect, the detuning offset Δfdet might not be preset and can be determined by scanning the laser operation frequency fc1 within a second predetermined frequency range.

In one example, the controller 200 controls the laser source 100 by further varying an amplitude of the control signal 221 to offset the laser operation frequency fc1 from the passband center frequency fop1, and the frequency offset from the passband center frequency fop1 is made by gradually increasing (or decreasing) the laser operation frequency by a frequency variation interval to determine a detuning offset Δfdet where the best signal quality is observed (or found). In one embodiment, the second predetermined frequency range is narrower than the first predetermined frequency range.

For example, the detuning offset Δfdet is obtained by varying the laser operation frequency fc1 within the second predetermined frequency range toward a lower frequency band and monitoring one or more signal quality-related parameters from an output node of the frequency reshaper 300 and/or at one end (e.g., one of an optical receiver) of an optical transmission medium over which the modulated signal 111 is transmitted.

In one embodiment, the signal quality-related parameters include, but are not limited to: an extinction ratio, a bit-error rate, a Q-factor, etc.

In one embodiment, the frequency reshaper 300 is configured to have a plurality of passbands to support corresponding plurality of optical communication channels, and the laser source 100 is configured to be switched over a plurality of frequencies each of which corresponds to one of the passbands of the frequency reshaper 300 (or one of the optical communication channels).

Throughout the present disclosure, unless explicitly indicated, it is assumed that each of the passbands of the frequency reshaper 300 corresponds to one of the optical communication channels; for example, a center frequency of each passband of the frequency reshaper 300 is equal to a center frequency of its corresponding optical communication channel.

Figure 5:
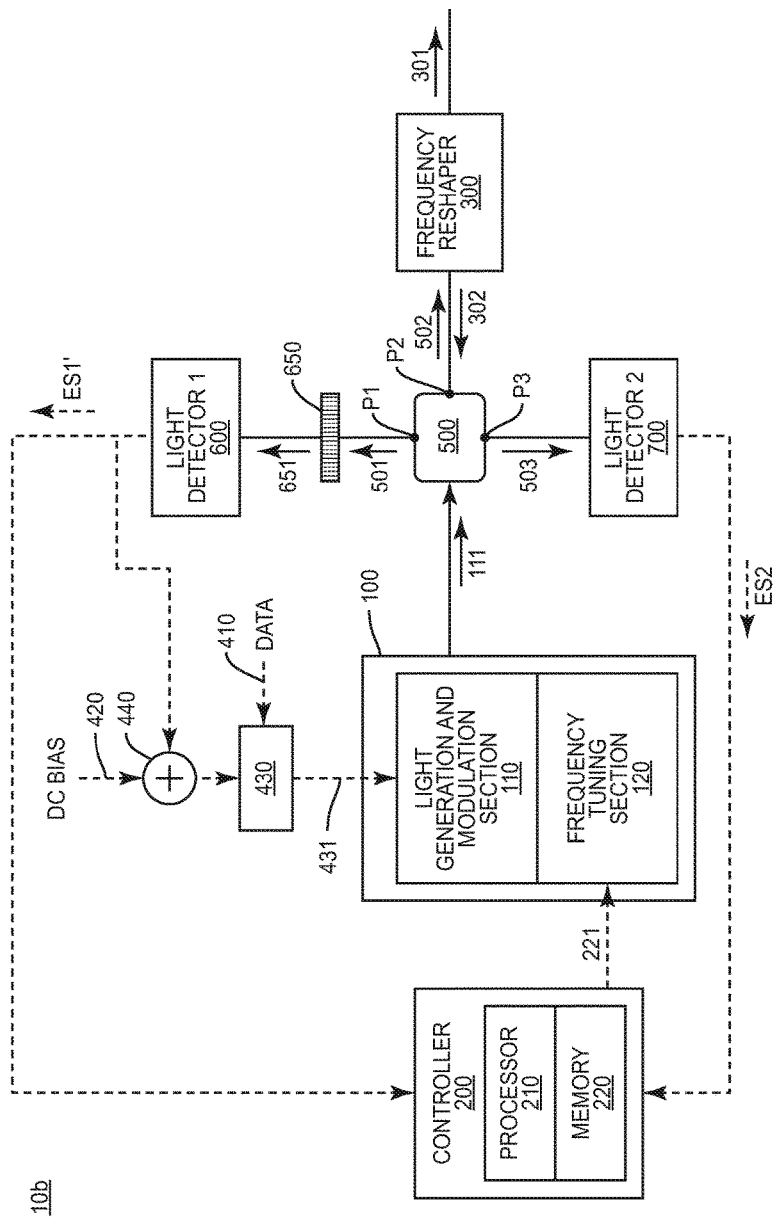
FIG. 5 depicts an optical transmitter according to a non-limiting exemplary embodiment of the present disclosure.

Referring now to FIG. 5, depicted is an optical transmitter 10b according to an embodiment that includes an optical filter 650 in the first optical path of FIG. 1. The optical transmitter 10b of FIG. 5 has substantially the same configuration as the optical transmitter 10a of FIG. 1 except the optical filter 650. Thus, duplicate description thereof will be omitted for the sake of simplicity.

Figure 6A:
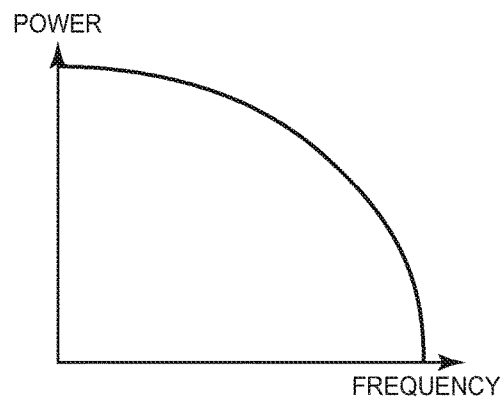
FIG. 6A depicts an example spectral response curve of a first optical path of FIG. 5 according to a non-limiting exemplary embodiment of the present disclosure.
Figure 6B:
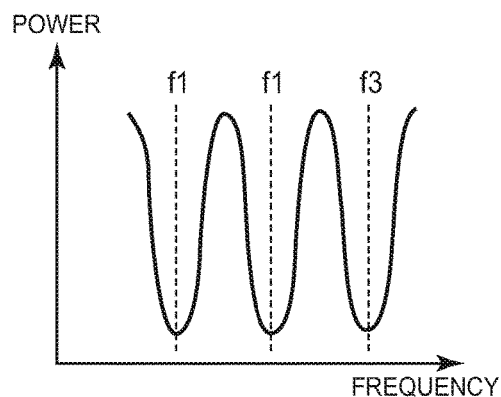
FIG. 6B depicts an example spectral response curve of a stopband of a frequency reshaper of FIG. 5 according to a non-limiting exemplary embodiment of the present disclosure.
Figure 6C:
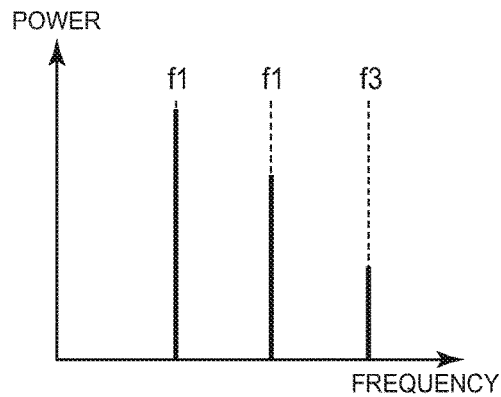
FIG. 6C depicts an example diagram showing power variation of an error signal when a laser operation frequency varies according to a non-limiting exemplary embodiment of the present disclosure.

Referring now to FIG. 6A, the optical filter 650 has a spectral response curve that gradually varies over multiple optical communication channels. FIG. 6B shows a stopband spectral response curve of the frequency reshaper 300. The frequency reshaper 300 may have multiple stopbands (or passbands) which correspond to multiple frequencies f1, f2 and f3, respectively, over which the laser source 100 is switched or a plurality of laser sources generate multiple frequencies f1, f2 and f3, respectively. Thus, in this embodiment, power of an optical signal 651 at the output of the optical filter 650 decreases as the laser operation frequency fc1 is shifted from f1 to f3. The optical signal 651 is converted to an electrical signal ES1'. Thus, referring back to FIG. 5, an error signal corresponding to a difference between the signals ES1' and ES2 decreases as the laser operation frequency moves from f1 to f3.

This configuration of FIG. 5 including the optical filter 650 allows a system to monitor currently working optical communication channels—e.g., at which optical channel the laser operation frequency is operated or positioned—without using particular optical spectrum monitoring means such as an optical spectrum analyzer.

Although it is illustrated in FIG. 6A that the spectral response curve of the optical filter 650 is designed to be decreased in the frequency domain, exemplary embodiments are not limited thereto. For example, the spectral response curve can be designed to be increased in the frequency domain. In addition, in some aspects, the optical filter 650 can be located in other locations, e.g., in the second optical path, or either the first light detector 600 or the second light detector 700 can be designed to have the example spectral response curve of FIG. 6A which is substantially the same or similar to that of the optical filter 650.

Figure 7:
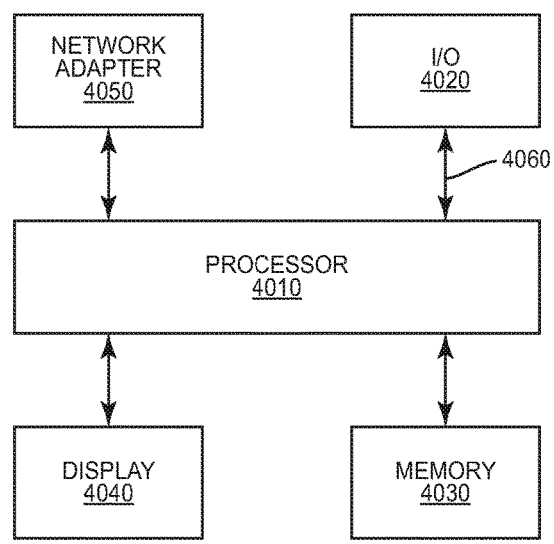
FIG. 7 is a block diagram of a computing system according to a non-limiting exemplary embodiment of the present disclosure.

FIG. 7 is a block diagram of a computing system 4000 according to a non-limiting exemplary embodiment of the present disclosure.

Referring to FIG. 7, the computing system 4000 may be used as a platform for performing the functions or operations described hereinabove with respect to the optical transmitter 10a of FIG. 1, the optical transmitter 10b of FIG. 5 and/or the methods of FIGS. 3A-3C.

In addition, the computing system 4000 may be implemented with a ultra-mobile personal computer (UMPC), a net-book, a personal digital assistance (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

Referring to FIG. 7, the computing system 4000 may include a processor 4010, I/O devices 4020, a memory system 4030, a display device 4040, and a network adaptor 4050.

The processor 4010 may drive the I/O devices 4020, the memory system 4030, the display device 4040, and the network adaptor 4050 through a bus 4060.

The computing system 4000 may include a program module for performing the functions or operations described hereinabove with respect to the optical transmitter 10a of FIG. 1, the optical transmitter 10b of FIG. 5 and/or the methods of FIGS. 3A-3C according to exemplary embodiments. For example, the program module may include routines, programs, objects, components, logic, data structures, or the like, for performing particular tasks or implement particular abstract data types. The processor (e.g., 4010) of the computing system 4000 may execute instructions written in the program module to perform the functions or operations described with respect to the optical transmitter 10a of FIG. 1, the optical transmitter 10b of FIG. 5 and/or the methods of FIGS. 3A-3C. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) can communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, or the like.

Exemplary embodiments of the present disclosure may include a system, a method, and/or a computer program product. The computer program product may include a non-transitory computer readable storage medium (e.g., the memory system 4030) having computer readable program instructions thereon for causing a processor to carry out aspects of the present disclosure.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device, and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description but is not intended to be exhaustive or limited to the present disclosure in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated but fall within the scope of the appended claims.

What is claimed is:

1. An optical transmitter, comprising:
a light source configured to generate a modulated signal whose operation frequency corresponds to a first communication channel, the modulated signal being divided and traveling along with at least a first optical path and a second optical path to generate a first optical signal and a second optical signal, respectively;
a first light detector configured to receive and convert the first optical signal to a first electrical signal;
a second light detector configured to receive and convert the second optical signal to a second electrical signal, the second optical path including a frequency reshaper having a stopband corresponding to the first communication channel, wherein the second optical signal has a minimum when the operation frequency is at a center frequency of the stopband or in the vicinity thereof;
at least one processor being configured to:
receive the first and second electrical signals;
obtain an error signal corresponding to a difference in magnitude between the first and second electrical signals;
find a maximum of the error signal by varying the operation frequency over a first predetermined frequency range of the first communication channel; and
determine that the operation frequency is matched to a passband of the frequency reshaper corresponding to the first communication channel when the error signal reaches the maximum, wherein the passband corresponds to the first communication channel and is substantially opposite in spectral response to the stopband,
wherein a spectral response of the first optical path is flat over at least the first communication channel or varies more slowly than a spectral response of the stopband.

2. The optical transmitter of claim 1, wherein the light source comprises a frequency tunable laser.

3. The optical transmitter of claim 1, wherein the at least one processor is further configured to stop varying the operation frequency upon determining that the operation frequency is matched to the passband of the frequency reshaper.

4. The optical transmitter of claim 1, wherein to vary the operation frequency, the at least one processor is configured to provide a control signal to a frequency tuning section of the light source.

5. The optical transmitter of claim 4, wherein the frequency tuning section comprises a grating whose resonance frequency is varied depending on an amplitude of the control signal.

6. The optical transmitter of claim 1, wherein the at least one processor is further configured to adjust the operation frequency by a frequency offset from the passband center frequency upon determining that the operation frequency is matched to the passband of the frequency reshaper.

7. The optical transmitter of claim 6, wherein the frequency offset is a predetermined value based on a data rate of the modulated signal.

8. The optical transmitter of claim 6, wherein the frequency offset is obtained by varying the operation frequency within a second predetermined frequency range toward a lower frequency band and monitoring at least one signal quality-related parameter from at least one of an output node of the frequency reshaper and an optical receiver positioned at one end of an optical transmission medium over which the modulated signal is transmitted, the second predetermined frequency range being narrower than the first predetermined frequency range.

9. The optical transmitter of claim 1, wherein the first optical path comprises an optical filter whose spectral response curve gradually increases or decreases.

10. A control system for an optical transmitter including a light source, comprising:
at least one processor comprising hardware, the at least one processor being configured to:
receive a first electrical signal converted from a first optical signal received from a first optical path and a second electrical signal converted from a second optical signal, the first and second optical signals each being generated using a modulated signal output from the light source, wherein the second optical signal is obtained by passing a portion of the modulated signal through a stopband of a frequency reshaper;
obtain an error signal corresponding to a difference in magnitude between the first and second electrical signals;
find a maximum of the error signal by varying the operation frequency over a predetermined frequency range of a communication channel; and
determine that the operation frequency is matched to a passband of the frequency reshaper when the error signal reaches the maximum, the passband being substantially opposite in spectral response to the stopband,
wherein the second electrical signal has a minimum when the operation frequency of the light source is matched to a center frequency of the stopband or in the vicinity thereof, and
wherein a spectral response of the first optical path is flat over at least the communication channel or varies more slowly than a spectral response of the stopband.

11. The control system of claim 10, wherein the at least one processor is further configured to stop varying the operation frequency upon determining that the operation frequency is matched to the center frequency of the passband of the frequency reshaper.

12. The control system of claim 10, wherein to vary the operation frequency, the at least one processor is configured to provide a control signal to a frequency tuning section of the light source.

13. A method for driving an optical transmitter, comprising:
generating, using a light source, a modulated signal having an operation frequency corresponding to a first communication channel;
obtaining a first optical signal using passing a portion of the modulated signal through a first optical path;
obtaining a second optical signal using passing another portion of the modulated signal through a second optical path having a different spectral response curve from that of the first optical path;
converting, using a first light detector, the first optical signal to a first electrical signal;
converting, using a second light detector, the second optical signal to a second electrical signal, wherein the second optical path includes a frequency reshaper having a stopband corresponding to the first communication channel and the second optical signal has a minimum when the operation frequency is at a center of the stopband or in the vicinity thereof;

obtaining an error signal corresponding to a difference in magnitude between the first and second electrical signals;

finding a maximum of the error signal by varying the operation frequency over a first predetermined frequency range of the first communication channel; and determining that the operation frequency is matched to a passband of the frequency reshaper when the error signal reaches the maximum, the passband being substantially opposite in spectral response to the stopband, wherein the spectral response curve of the first optical path is flat at least over the first communication channel or varies more slowly than a spectral response curve of the stopband.

14. The method of claim 13, further comprising:

stopping of varying the operation frequency upon determining that the operation frequency is matched to the passband of the frequency reshaper.

15. The method of claim 13, wherein to vary the operation frequency, the method further comprising providing a control signal to a frequency tuning section of the light source.

16. The method of claim 13, further comprising:

adjusting the operation frequency by a frequency offset from the passband center frequency upon determining that the operation frequency is matched to the passband of the frequency reshaper.

17. The method of claim 16, wherein the frequency offset is a predetermined value based on a data rate of the modulated signal.

\* \* \* \* \*